Patented Oct. 23, 1928.

1,688,351

UNITED STATES PATENT OFFICE.

JOHANNES PFLEGER, OF FRANKFORT-ON-THE-MAIN, AND AUGUST ALBERT, OF MUNICH, GERMANY.

PROCESS FOR THE PRODUCTION OF UNSYMMETRICAL ARSENO COMPOUNDS.

No Drawing. Application filed November 29, 1924, Serial No 752,948, and in Austria April 12, 1923.

It is known that by reducing a mixture of two differently substituted aryl arsinic acids or aryl arsine oxides unsymmetrical arseno compounds may be prepared in order to combine the chemical and biological properties of both of the originating substances with each other.

According to the present invention unsymmetrical arseno compounds are produced which contain carbonyl groups in non-cyclical linkage.

Such compounds may, for instance, be obtained by subjecting different arseno carbonyl compounds in combination to a reduction process.

In the place of arsenic compounds having free carbonyl groups, their condensation products with nitrogen-hydrogen compounds of any kind containing amino groups susceptible of reaction such as for instance hydrazine derivatives, hydroxylamine and its derivatives, amido sulfonic acids, amido carbonic acids, amino aldehydes and ketones, acid amides, urea, etc., can also be used. Unsymmetrical arseno compounds of the desired nature may also be prepared by reducing a mixture of different condensation products.

Furthermore, arsenic compounds with free carbonyl groups may, for instance, be reduced together with condensation products of the kind mentioned.

Another way of producing compounds in accordance with our invention consists for example in reducing arsenic compounds having free carbonyl groups or their condensation products with nitrogen hydrogen compounds in combination with any other trivalent or pentavalent arsenic compounds such as for instance halogen-, nitro-, hydroxy-, amino-arylarsine oxides or carboxylated or sulfonated arsinic acids, glycine arsinic acids, urea derivatives of arsinic acids etc. By this method it is, for instance, possible to arrive at unsymmetrical arseno compounds which are on the one side of the formula free from carbonyl groups and contain on the other side this therapeutically valuable group either in the free state or combined by condensation with a nitrogen-hydrogen compound.

The process according to our invention is carried out in general by treating with suitable reducing agents a solution or suspension containing equimolecular or approximately equimolecular quantities of the reactionary components. As originating substances compounds with trivalent and pentavalent arsenic come into consideration.

By way of illustrating our said invention and to show how the same is to be carried out, we give the following examples:

(1) 0.36 grm. of 3-hydroxy-1-acetophenone arsinic acid-semicarbazone and 2.8 grms. of p-phenyl-glycine-arsinic acid are dissolved in 15 cc. of hot water and notwithstanding an eventual separation, 3 grms. of sodium hydrosulfite are added at 60-70° C. Immediately the light yellow arsenobenzene separates. After stirring for half an hour at about 65° C. the deposit is aspirated, washed with water and dried in vacuo. The arsenobenzene decomposes with foaming at about 215° C.

The following is a structural representation of the resulting compound:

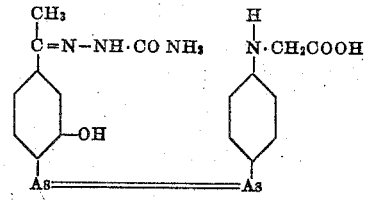

(2) 4 grms. of sodium hydrosulfite are added to a solution of 0.24 grm. of the sodium salt of the p-amino-phenyl arsinic acid and 0.30 grm. of the sodium salt of the p-acetophenone arsinic acid in 20 cc. of water at 60° C. The solution is well agitated during half an hour at 60-70° C., the separated light yellow arseno benzene is filtered off by suction, washed with water and dried in vacuo. It decomposes at about 200° C.

(3) To a suspension of 0.33 grm. of p-benzaldehyde arsinic acid-methylphenylhydrazone and 0.26 grm. p-hydroxy-phenyl arsinic acid in about 15 cc. of water at 65° C. 4 grms. of sodium hydrosulfite are added. On agitating for half an hour at 60–70° C. the arsenobenzene separates. It is then filtered off by suction, washed and dried in vacuo. Heated in a capillary tube it decomposes at about 280° C. after previous sintering.

The following is a structural representation of the resulting compound:

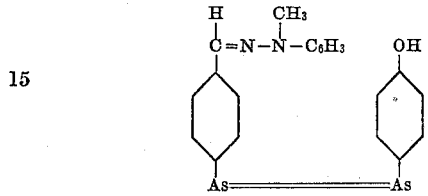

(4) To a solution at 65° C. containing 0.2 grm. of phenylarsinic acid and 0.3 grm. of oxyacetophenone-arsinic acid in 15 cc. of water are added 4.0 grms. of sodium hydrosulfite whereupon it is stirred at 60–70° C. for half an hour. The separating arseno benzene is sucked off and washed. The arseno benzene can be dissolved in caustic alkali and re-precipitated from the clear alkaline solution by means of acids. It decomposes at about 135° C.

(5) 4 grms. of hydrosulfite are added to a solution of 0.28 grm. of m-nitro-acetophenone-arsinic acid and 0.28 grm. of p-phenylglycine arsinic acid in 15 cc. of water at 65° C. excluding the air and agitating. After half an hour the arseno benzene is filtered off by suction, washed rapidly and dried in vacuo. The alkaline solution of the arseno benzene is colored an intense yellow. At temperatures above 200° C. it darkens and becomes black ultimately.

(6) 0.24 grm. of the oxime of p-benzaldehyde-arsinic acid are dissolved together with 0.24 grm. p-hydroxy-phenyl arsinic acid in 20 cc. of hot water and at 65° C. 4 grms. of sodium hydrosulfite are added whilst stirring thoroughly. The arseno benzene which separates having at the beginning a very light yellow color, gradually darkens to a dark yellow. After agitating for half an hour at 60–70° C. the arseno benzene is filtered off by suction, washed and dried in vacuo. When heated in a capillary tube it decomposes at about 230° C.

(7) 0.21 grm. of p-acetophenone-arsine oxide, 0.18 grm. of phenyl-arsine oxide and 4 grms. of sodium hydrosulfite are mixed intimately, the mixture is added to 17 cc. of water and at ordinary temperature shaken vigorously in a closed vessel for one half to one hour. The yellowish red arseno benzene separates. After filtering by suction, washing and drying in vacuo the arseno benzene fuses with decomposition at about 230° C.

(8) 0.30 grm. of chloro-benzal-acetone-arsinic acid and 0.24 grm. of the sodium salt of the p-hydroxy-phenyl-arsinic acid are dissolved in 20 cc. of hot water. 4 grms. of sodium hydrosulfite are added to the solution at about 65° C. and after stirring for half an hour at a temperature of 60–70° C. the deep yellow arseno benzene is filtered by suction and washed. It decolorizes and becomes black above 260° C.

The following is a structural representation of the resulting compound:

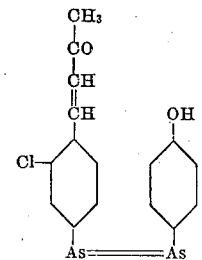

(9) 0.23 grm. of hydroxy-acetophenone-arsine oxide and 0.2 grm. of phenylarsinic acid are suspended in water at 60° C. Caustic soda solution (about 1.5 cc. of twice normal solution) is added cautiously whilst stirring, until the substances are just dissolved. To the solution are added 4 grms. of hydrosulfite stirring vigorously all the time and the reduced product carried off by suction, washed and dried in vacuo. It fuses just above 145° C. with decomposition.

(10) 0.26 grm. of p-acetophenone-arsinic acid and 0.23 grm. of benzaldehyde-arsinic acid are dissolved together in about 10 cc. of hot water. At a temperature of about 60° C. 2.5 grms. of sodium hydrosulfite are added to the solution whilst stirring thoroughly. A yellow arseno benzene separates immediately. After agitating for half an hour at the temperature mentioned the arseno benzene is aspirated and washed with water.

(11) 3 grms. of the semi-carbazone of the acetophenone-arsinic acid and 2.4 grms. of acetophenone arsinic acid are dissolved in 100 cc. of hot water, to which 20 cc. of normal sodium acetate solution are added 30 grms. of sodium hydrosulfite are added to the solution at 60–70° C. The solution is then kept at that temperature for one half to one hour under continual stirring. The separating orange colored arseno benzene is filtered by suction and washed afterwards with water.

(12) 0.26 grm. of p-propiophenone-arsinic acid and 0.36 grm. 3-hydroxy-1-acetophenone-arsinic acid-semi-carbazone are dissolved in about 16 cc. of hot water and 4 grms. of sodium hydrosulfite are added at about 65° C. The reaction product is kept at about 65° C. for half an hour being well stirred during that time. The separated arseno benzene is aspirated and washed well with water afterwards. After being dried in vacuo it fuses at about 230° C. foaming strongly and becoming dark in color.

The following is a structural representation of the resulting compound:

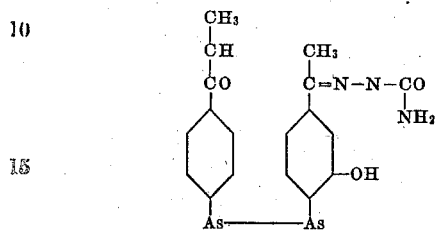

(13) 0.33 grm. of benzaldehyde-arsinic acid-methyl-phenyl-hydrazone and 0.3 grm. of mono-sodium salt of the p-hydroxy-acetophenone-arsinic acid are warmed with 15 cc. of water to 65° C. and mixed carefully with caustic soda solution, until the substances have just gone into solution. 5 grms. of sodium hydrosulfite are then added whilst stirring. The very light yellow colored arseno benzene separates at once. Under stirring at about 60-70° C. the reaction is allowed to go to completion adding now and then if necessary an additional 1-2 grms. of hydrosulfite. After three quarters of an hour the arseno benzene may be drawn off, washed with water and dried in vacuo.

(14) The mixture of 0.24 grm. of the oxime of benzaldehyde arsinic acid and 0.32 grm. of m-hydroxy-acetophenone-arsinic acid-semi-carbazone is suspended in 20 cc. of water and heated to 65° C. Under agitation 4 grms. of sodium hydrosulfite are added. After half an hour a pale yellow deposit is filtered off by suction, washed with water and dried in vacuo.

The following is a structural representation of the resulting compound:

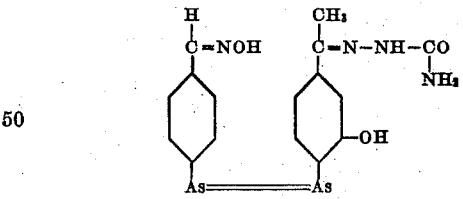

(15) 0.32 grm. of m-hydroxy-acetophenone-arsinic acid-semicarbazone is ground with 0.2 grm. of p-acetophenone-arsine-oxide, the mixture suspended in about 17 cc. of water at 60° C. and 4 grms. of sodium hydrosulfite are added whilst stirring. The precipitate, at the beginning reddish brown, gradually becomes yellow. After agitating for about half an hour at 65° C. the arseno benzene is drawn off, washed and dried in vacuo. Heated in a capillary tube it assumes a somewhat darker color at temperatures above 170° C. and gradually disappears at 280° C.

(16) 0.2 grm. of p-acetophenone-arsine-oxide, 0.23 grm. of hydroxy-acetophenone-arsine-oxide and 4 grms. of sodium hydrosulfite are triturated together and the mixture is entered into about 17 cc. of water at 65° C. The mixture is well stirred during half an hour at 65° C., the light yellow arseno benzene is then filtered by suction, washed and dried in vacuo.

(17) 3 grms. of sodium hydrosulfite are added to 0.33 grm. of p-benzalacetone-arsinic acid-semicarbazone and 0.32 grm. of hydroxy-acetophenone-arsinic acid-semicarbazone suspended in 20 cc. of water, warmed to a temperature of about 65° C., stirring thoroughly. After half an hour an additional 2 grms. of hydrosulfite are added whilst agitating all the time. After a short time the deposit is aspirated, washed and dried in vacuo.

The following is a structural representation of the resulting compound:

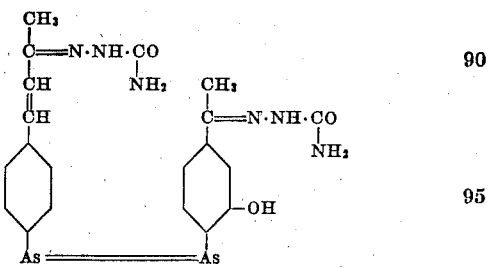

In the following claims the expression "arsenic compounds" is to be understood, that one may use as starting material compounds containing trivalent arsenic as well as compounds containing pentavalent arsenic.

What we claim is:

1. Process for the production of unsymmetrical arsenic compounds which consists in reducing arsenic compounds with carbonyl groups of the general formula:

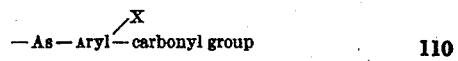

together with arsenic compounds of the general formula

wherein X stands for H, halogen, OR (R being H or an acyl group), NO$_2$, NH$_2$, NH.CH$_2$COOH, SO$_3$H, COOH,

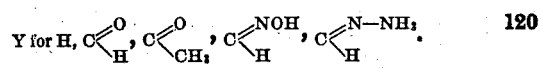

2. Process for the production of unsymmetrical arsenic compounds which consists in reducing arsenic compounds with carbonyl groups of the general formula:

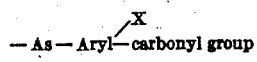

the carbonyl group having the general formula:

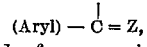

in which Z stands for a residue linked to the carbon atom by means of nitrogen, together with arsenic compounds of the general formula:

wherein X stands for H, halogen, OR (R being H or an acyl group), $NO_2$, $NH_2$, $NH.CH_2COOH$, $SO_3H$, $COOH$,

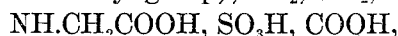

3. Process for the production of unsymmetrical arsenic compounds which consists in reducing arsenic compounds with carbonyl groups of the general formula:

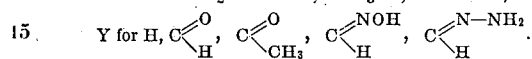

the carbonyl group having the formula:

$(Aryl) - C = N.NH.CO.NH_2$ together with arsenic compounds of the general formula:

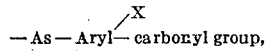

wherein X stands for H, halogen, OR (R being H or an acyl group), $NO_2$, $NH_2$, $NH.CH_2COOH$, $SO_3H$, $COOH$,

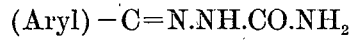

4. An unsymmetrical arsenic compound of the general formula:

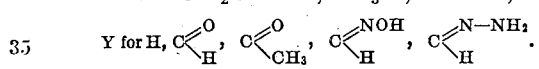

wherein X stands for H, halogen, OR (R being H or an acyl group), $NO_2$, $NH_2$, $NH.CH_2COOH$, $SO_3H$, $COOH$,

5. An unsymmetrical arsenic compound of the general formula:

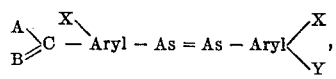

wherein A stands for H or an aliphatic residue, B stands for a residue linked to the carbon atom by means of nitrogen, X stands for H, halogen, OR (R being H or an acyl group), $NO_2$, $NH_2$, $NH.CH_2COOH$, $SO_3H$, $COOH$,

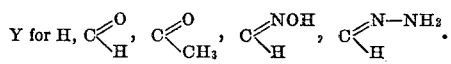

6. An unsymmetrical arsenic compound of the general formula:

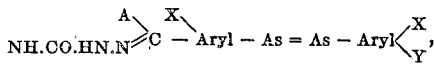

wherein A stands for H or an aliphatic residue, X stands for H, halogen, OR (R being H or an acyl group), $NO_2$, $NH_2$, $NH.CH_2COOH$, $SO_3H$, $COOH$,

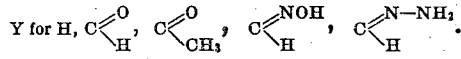

Signed at Frankfort-on-the-Main, Germany, this 11th day of November, A. D. 1924.

JOHANNES PFLEGER.
AUGUST ALBERT.